US012806602B2

(12) United States Patent
Hu et al.

(10) Patent No.: US 12,806,602 B2
(45) Date of Patent: Nov. 24, 2026

(54) METHOD FOR REGENERATING ADSORPTION MEDIA USING CARBON DIOXIDE

(71) Applicant: GRANITEFUEL ENGINEERING INC., Concord (CA)

(72) Inventors: Linjie Hu, Toronto (CA); Haiqing Liu, Concord (CA); Shazam S. Williams, Concord (CA)

(73) Assignee: GRANITEFUEL ENGINEERING INC., Concord, CA (US)

( * ) Notice: Subject to any disclaimer, the term of this patent is extended or adjusted under 35 U.S.C. 154(b) by 593 days.

(21) Appl. No.: 18/258,118

(22) PCT Filed: Dec. 17, 2021

(86) PCT No.: PCT/CA2021/051832
§ 371 (c)(1),
(2) Date: Jun. 23, 2023

(87) PCT Pub. No.: WO2022/126278
PCT Pub. Date: Jun. 23, 2022

(65) Prior Publication Data

US 2024/0109053 A1 Apr. 4, 2024

Related U.S. Application Data

(60) Provisional application No. 63/126,628, filed on Dec. 17, 2020.

(51) Int. Cl.
*B01J 20/34* (2006.01)
*B01D 53/04* (2006.01)
(Continued)

(52) U.S. Cl.
CPC ...... *B01J 20/3458* (2013.01); *B01D 53/0462* (2013.01); *B01D 53/228* (2013.01);
(Continued)

(58) Field of Classification Search
CPC ............ B01D 53/0407; B01D 53/0462; B01D 53/047; B01D 53/228; B01D 53/229;
(Continued)

(56) References Cited

U.S. PATENT DOCUMENTS 7,025,803 B2 4/2006 Wascheck et al.
2004/0103782 A1* 6/2004 Wascheck ................ C10L 3/10 96/135
(Continued)

FOREIGN PATENT DOCUMENTS

AU 2016271299 A1 4/2024
FR 2836058 A1 8/2003
(Continued)

OTHER PUBLICATIONS

EPO Extended European Search Report for Application No. 21904738.8 mailing date Apr. 7, 2025, 13 pages.
(Continued)

*Primary Examiner* — Brian A Mccaig
(74) *Attorney, Agent, or Firm* — Foley & Lardner LLP

(57) ABSTRACT

Disclosed herein are systems and methods for regenerating media in a siloxane removal system. In particular, the present disclosure relates to a method for regenerating an adsorption medium, comprising receiving a source gas stream comprising at least one hydrocarbon and carbon dioxide; separating the source gas stream into a carbon dioxide-rich gas stream, and a substantially carbon dioxide-free gas stream; directing the carbon dioxide-rich gas stream into a regeneration vessel containing an adsorption medium having one or more adsorbed impurities on the adsorption medium; desorbing impurities from the adsorption medium by contacting the adsorption medium with the carbon dioxide-rich gas stream to generate a carbon dioxide-rich gas containing desorbed impurities and a regenerated adsorption
(Continued)

medium; and directing the carbon dioxide-rich gas stream containing desorbed impurities out of the regeneration vessel.

18 Claims, 3 Drawing Sheets

(51) Int. Cl.
*B01D 53/22* (2006.01)
*B01D 69/14* (2006.01)

(52) U.S. Cl.
CPC ......... *B01D 53/229* (2013.01); *B01D 69/148* (2013.01); *B01J 20/3408* (2013.01); *B01J 20/3416* (2013.01); *B01J 20/3425* (2013.01); *B01J 20/3433* (2013.01); *B01J 20/3483* (2013.01); *B01D 2253/102* (2013.01); *B01D 2253/108* (2013.01); *B01D 2253/202* (2013.01); *B01D 2256/245* (2013.01); *B01D 2257/504* (2013.01); *B01D 2257/556* (2013.01); *B01D 2259/4009* (2013.01)

(58) Field of Classification Search
CPC ............ B01D 69/148; B01D 2253/102; B01D 2253/104; B01D 2253/106; B01D 2253/108; B01D 2253/202; B01D 2256/245; B01D 2257/504; B01D 2257/55; B01D 2257/556; B01D 2258/05; B01D 2259/4009; B01J 20/08; B01J 20/103; B01J 20/18; B01J 20/20; B01J 20/26; B01J 20/3408; B01J 20/3416; B01J 20/3425; B01J 20/3433; B01J 20/3458; B01J 20/3483; B01J 20/3491; Y02C 20/40
See application file for complete search history.

(56) References Cited

U.S. PATENT DOCUMENTS

| | | | |
|---|---|---|---|
| 2019/0001263 | A1 | 1/2019 | Prince et al. |
| 2019/0169517 | A1 | 6/2019 | Mitariten |

FOREIGN PATENT DOCUMENTS

| | | | | | |
|---|---|---|---|---|---|
| FR | 3035337 | A1 | | 10/2016 | |
| MY | 190255 | A | * | 4/2022 | ............. B01J 20/28 |
| WO | WO-2012/092980 | A1 | | 7/2012 | |

OTHER PUBLICATIONS

International Search Report and Written Opinion dated Apr. 4, 2022 in corresponding International Application No. PCT/CA2021/051832.

International Preliminary Report on Patentability for PCT App. PCT/CA2021/051832 dated Jun. 13, 2023 (8 pages).

* cited by examiner

METHOD FOR REGENERATING ADSORPTION MEDIA USING CARBON DIOXIDE

CROSS-REFERENCE TO RELATED APPLICATIONS

This application is a national stage entry of PCT/CA2021/051832, filed on Dec. 17, 2021, which claims the benefit of and priority to U.S. Provisional Patent Application No. 63/126,628, filed on Dec. 17, 2020, the entire disclosures of which are incorporated by reference herein.

FIELD

The present disclosure relates to systems and methods for regenerating media in a siloxane removal system. In particular, the present disclosure relates to systems and methods for regenerating siloxane removal media using a carbon dioxide-rich gas stream.

BACKGROUND

The following discussion is merely provided to aid the reader in understanding the disclosure and is not admitted to describe or constitute prior art thereto.

Biogas is a waste product from sources including anaerobic digestion of waste materials, such as waste water sludge, animal farm manure sewage and manure, landfill wastes, agrofood industry sludge, or any source in which organic waste is broken down in a substantially oxygen-free environment. The biogas produced by these activities typically contains approximately 40-60% methane, 25% to 50% carbon dioxide, 0% to 10% nitrogen, 0% to 1% hydrogen, 0% to 3% sulfur, and 0% to 2% oxygen (by volume) as well as an assortment of trace impurities that may include siloxanes, halogenated compounds, volatile organic compounds (VOCs), and ammonia, among others.

Because biogas is typically generated from organic matter, it is considered a renewable energy source which can be used as a fuel for internal combustion engines and/or boilers to generate electricity and heat, or to produce biomethane by separating impurities and carbon dioxide. The biogases, however, contain noxious impurities, including siloxanes, hydrogen sulfide, and organic sulfur compounds. These impurities can be harmful to the environment and can damage heat and power generation devices. For example, siloxanes present in biogas produce silicon dioxide during the biogas combustion process. The silicon dioxide thus produced may be deposited within heat and power devices, damaging internal components such as engine pistons, spark plugs, and exhaust treatment devices. Deposited silicon dioxide within these internal components can cause premature equipment breakdown (e.g., wear to moving equipment and breakdown of catalysts or heat exchangers), requiring more frequent maintenance or overhauls of heat and power generation devices. In fuel cell systems, siloxanes may be deposited on downstream catalysts, forming abrasive silicates that cause deterioration of the fuel cell efficiency or system failure.

Various methods exist for removing siloxanes from biogas. For example, in the temperature swing process (TSP), raw biogas enters into a dual vessel bed system, where adsorbents such as activated carbons (ACs), inorganics (silica and zeolites), or polymeric resins adsorb siloxane molecules and other harmful volatile organic compounds (VOCs), removing them from the biogas stream. The purified biogas can then be used as fuel (e.g., for an engine or for heat/power generation). In some embodiments, only a single adsorption vessel is used. Optionally, the system may use an adjustable cycle to alternate between adsorption vessels, which are regularly purged with a hot gas stream during continuous operation. In multiple-adsorption-vessel systems, one adsorption vessel may be configured to remove impurities from a source gas stream (e.g., a biogas stream), while the media in another adsorption vessel is regenerated (e.g., by using a heat and/or a gas stream).

This self-regeneration system ensures the continuous operation of the process. However, there are some major problems associated with existing regeneration procedures. For example, the TSPs typically use ambient air to regenerate the saturated adsorbents (media). However, the ambient air must be electrically heated to 50 to 400° C., requiring an additional power consumption ranging from 20 to 300 kilowatts for purifying 1200 SCFM (standard cubic feet per minute) of biogas. In addition to costs imposed by additional power consumption, this process poses potential safety hazards. For instance, during the switch from process gas stream to air, the gas and air mixture form an explosive mixture. During the regeneration, the heated air contains desorbed siloxanes and VOCs, which can ignite in hot air, presenting a fire hazard. Additionally, the hot air may decompose certain adsorption media (e.g., polymeric media), reducing their capacity to remove siloxanes from a gas stream and imposing high replacement costs.

It would therefore be advantageous to provide an improved method of regenerating adsorption media that addresses these and other issues.

SUMMARY

In one aspect, which may be combined with any other aspect or embodiment, the present disclosure relates to a method for regenerating an adsorption medium, comprising: receiving a source gas stream comprising at least one hydrocarbon and carbon dioxide; separating the source gas stream into a carbon dioxide-rich gas stream and a substantially carbon dioxide-free gas stream; directing the carbon dioxide-rich gas stream into a regeneration vessel containing an adsorption medium having one or more adsorbed impurities on the adsorption medium; desorbing impurities from the adsorption medium by contacting the adsorption medium with the carbon dioxide-rich gas stream to generate a carbon dioxide-rich gas containing desorbed impurities and a regenerated adsorption medium; and directing the carbon dioxide-rich gas containing desorbed impurities out of the regeneration vessel.

In some embodiments, the at least one hydrocarbon comprises methane. In some embodiments, the adsorbed impurities comprise siloxanes. In some embodiments, the separating of carbon dioxide can be performed using a membrane, pressure swing adsorption system, temperature swing adsorption system, vacuum swing adsorption system, distillation system, or any other suitable gas separation process (or separator). In some embodiments, the separating of carbon dioxide is performed using a membrane.

In some embodiments, the method further comprises, after the separating and before the desorbing, heating the carbon dioxide-rich gas stream. In some embodiments, the heating comprises raising the temperature of the $CO_2$-rich gas stream to a temperature of from 50° C. to 400° C. In some embodiments, the heating comprises raising the temperature of the carbon dioxide-rich gas stream to a temperature of from 50° C. to 150° C.

In some embodiments, the carbon dioxide-rich gas stream comprises at least 90 vol. % carbon dioxide.

In some embodiments, the adsorption medium in the regeneration vessel comprises polymer beads, alumina, silica gel, activated carbon, a zeolite, or any combination thereof.

In some embodiments, the source gas stream is received from a digester or landfill.

In some embodiments, the method further comprises: after receiving the source gas stream comprising at least one hydrocarbon and carbon dioxide, and before separating the source gas stream into the carbon dioxide-rich gas stream and the substantially carbon dioxide-free gas stream: directing the source gas stream into an adsorption vessel containing an adsorption medium in the adsorption vessel; and contacting the source gas stream with the adsorption medium in the adsorption vessel and adsorbing impurities from the source gas stream onto the adsorption medium in the adsorption vessel to generate an adsorption medium in the adsorption vessel containing one or more adsorbed impurities on the adsorption medium in the adsorption vessel.

In some embodiments, the adsorption medium in the adsorption vessel comprises polymer beads, alumina, silica gel, activated carbon, a zeolite, or a combination thereof.

In another aspect, which may be combined with any other aspect or embodiment, the present disclosure relates to a system for regenerating an adsorption medium, comprising: a gas inlet coupled to an inlet gas line and in fluid communication with a source gas stream; a membrane coupled to the gas inlet line, wherein the membrane is downstream from the gas inlet, and wherein the membrane is configured to separate the source gas stream into a carbon dioxide-rich gas stream and a substantially carbon dioxide-free gas stream; an adsorption vessel coupled to the gas inlet line between the gas inlet and the membrane, and wherein the adsorption vessel contains an adsorption medium that adsorbs impurities from the source gas stream; a regeneration line between the membrane and a regeneration vessel downstream from the membrane, wherein the regeneration line is configured to direct the carbon dioxide-rich gas stream into the regeneration vessel, and wherein the regeneration vessel comprises an adsorption medium comprising adsorbed impurities; a heater coupled to the regeneration line between the membrane and the regeneration vessel, wherein the heater is configured to heat the carbon dioxide-rich gas stream before it enters the regeneration vessel; and a gas outlet coupled to the regeneration line, wherein the gas outlet is downstream from the regeneration vessel.

In some embodiments, the membrane is a mixed matrix membrane.

In some embodiments, the gas outlet is in fluid communication with a vent, gas storage system, or a flare. In some embodiments, the gas outlet is in fluid communication with a system for sequestering $CO_2$ or desorbed impurities.

In some embodiments, the adsorption medium in the adsorption vessel comprises activated carbon, silica gel, alumina, zeolites, polymeric resins, or a combination thereof. In some embodiments, the adsorption medium in the regeneration vessel comprises activated carbons, silica gel, alumina, zeolites, polymeric resins, or combinations thereof.

In some embodiments, the system is configured to switch between configurations to alternately regenerate the adsorption medium in the adsorption vessel or the adsorption medium in the regeneration vessel.

The foregoing general description and following detailed description are exemplary and explanatory and are intended to provide further explanation of the disclosure as claimed. Other objects, advantages, and novel features will be readily apparent to those skilled in the art from the following brief description of the drawings and detailed description of the disclosure.

DETAILED DESCRIPTION

Figure 1:
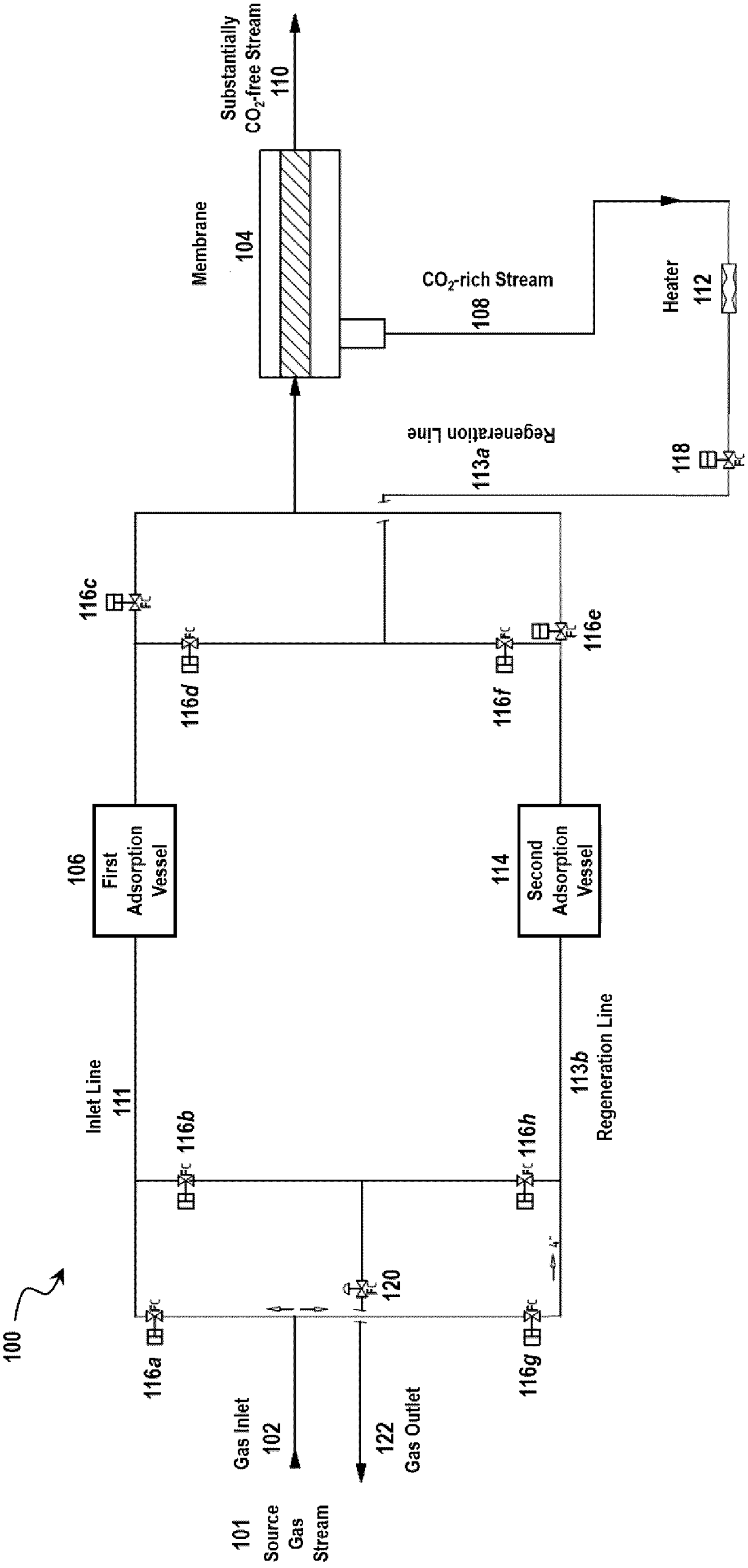
FIG. 1 is a schematic illustration of a system for regenerating an adsorption vessel using carbon dioxide gas, according to an embodiment.

Referring to FIG. 1, a system 100 for regenerating an adsorption vessel using carbon dioxide gas comprises a gas inlet 102 in fluid communication with an inlet line 111 and a membrane 104. A first adsorption vessel 106 may be placed along the inlet line 111 between the gas inlet 102 and the membrane 104 to remove impurities (e.g., siloxanes) from a source gas stream 101. The membrane 104 separates the source gas stream 101 into a first gas stream 108 that is carbon-dioxide rich and a second gas stream 110 that is substantially carbon dioxide-free. In some embodiments, the carbon dioxide-rich stream is directed to a heater 112 in fluid communication with a second adsorption vessel 114 through a regeneration line 113*a*. The heated carbon dioxide-rich gas stream may be directed into the second adsorption vessel 114, which may contain an adsorbent containing adsorbed impurities (e.g., siloxanes, hydrocarbons, etc.). In the second adsorption vessel 114, the adsorption medium is contacted with the first carbon dioxide-rich stream 108 to desorb impurities from the adsorption medium. After contacting the adsorption medium with the first carbon dioxide-rich stream 108, the adsorption medium is regenerated, and the desorbed impurities are present within the first carbon dioxide-rich stream 108 and are directed out of the second adsorption vessel 114 through the regeneration line 113*b* to a gas outlet 122. The heater 112 may be in communication with a valve or regulator 118. The gas outlet may be in communication with a valve or regulator 120.

Figure 2A:
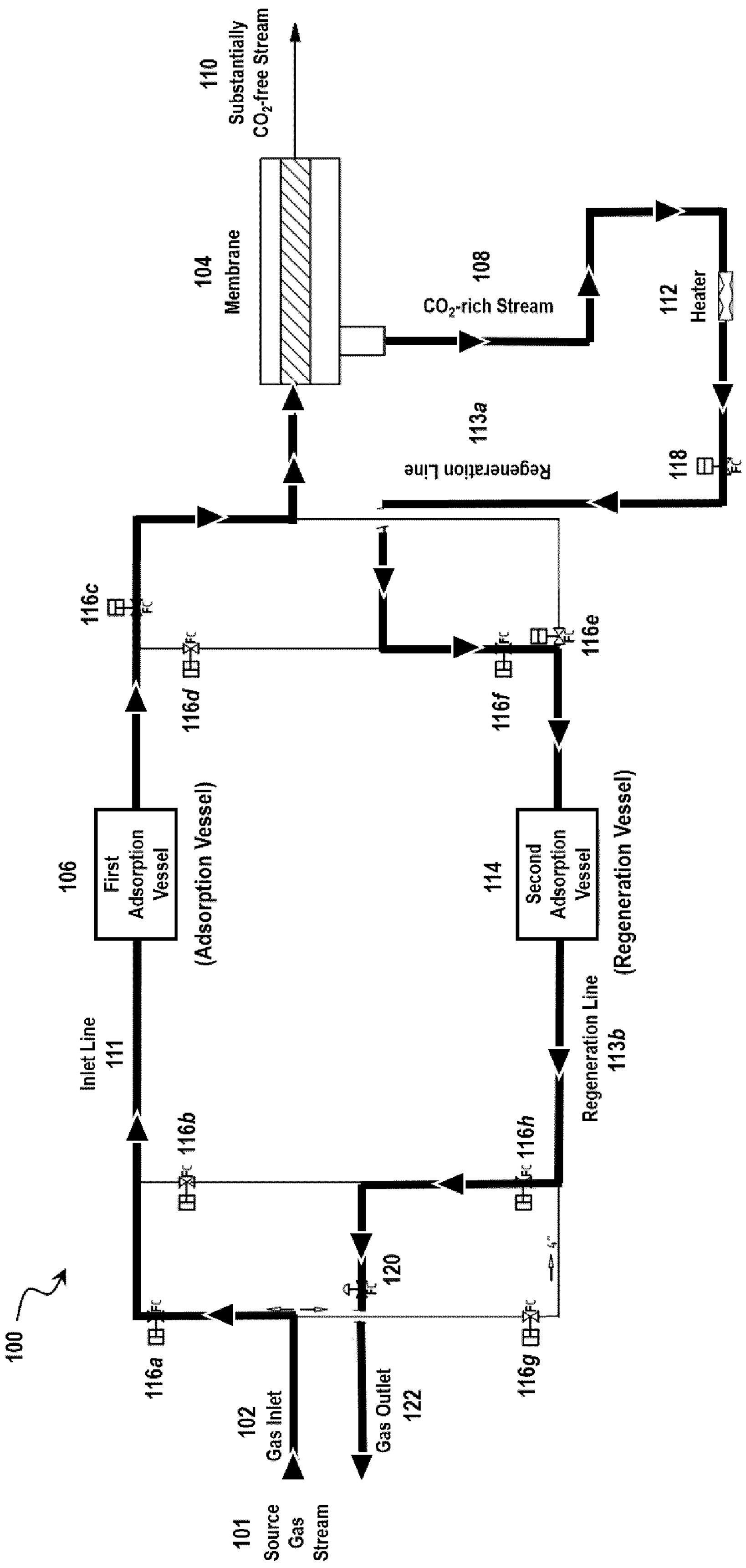
FIG. 2A and FIG. 2B show schematic illustrations of two different configurations for a system for regenerating media in two different adsorption vessels, according to an embodiment.
Figure 2B:
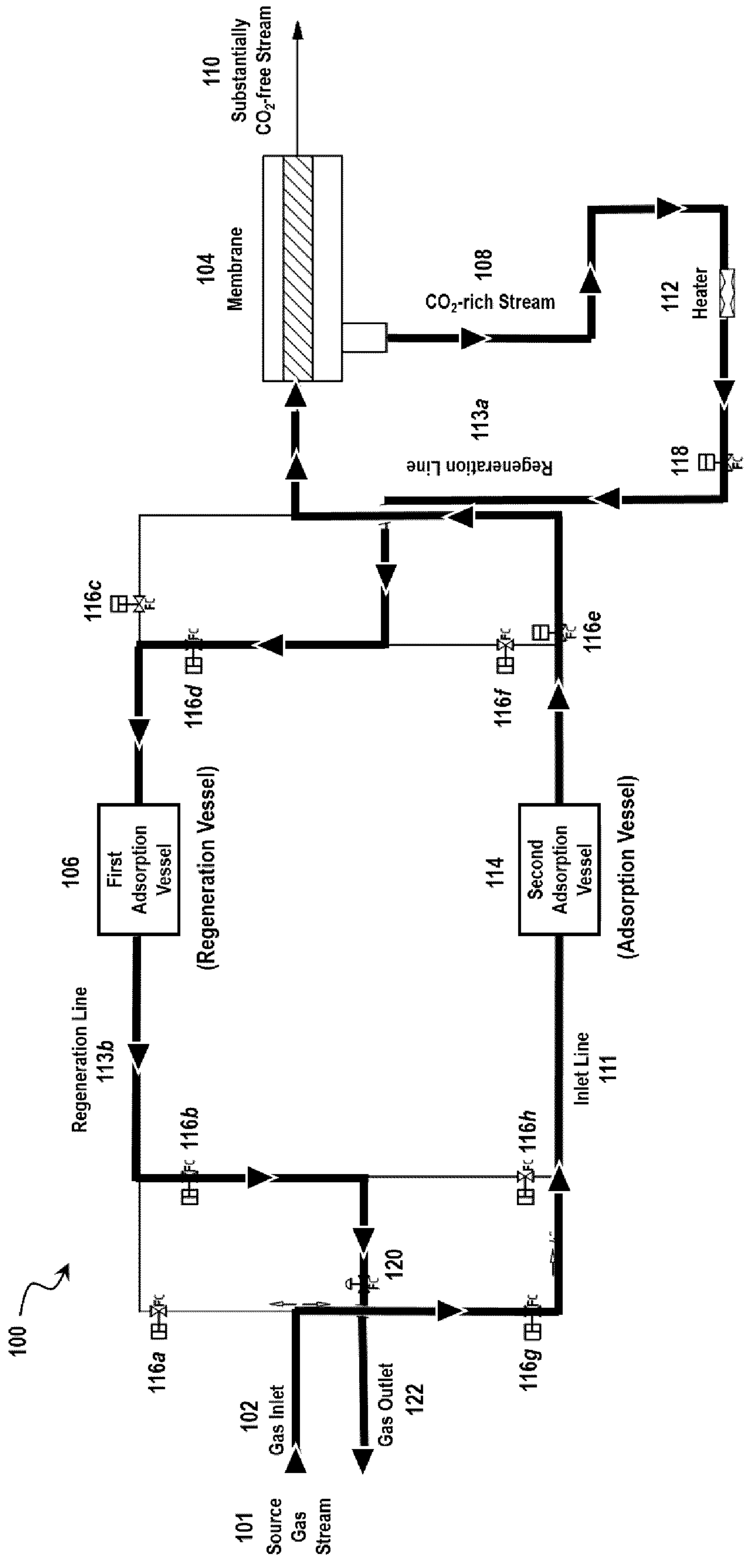

In FIG. 2A, the system is configured to regenerate a second adsorption vessel. In FIG. 2B, the system is configured to regenerate a first adsorption vessel. The system according to the present disclosure may be switched between configurations to alternately regenerate the first adsorption vessel and the second adsorption vessel.

Referring to FIG. 2A, in some embodiments, the system may be configured to remove impurities from a source gas stream 101 using a first adsorption vessel 106, while using a $CO_2$-rich gas stream 108 to regenerate the adsorption medium inside a second adsorption vessel 114. Alternatively, referring to FIG. 2B, the system may be configured to remove impurities from a source gas stream 101 using a second adsorption vessel 114 while using a $CO_2$-rich gas stream to regenerate the media inside a first adsorption vessel 106. To switch between or among different configurations, a source gas stream 101 may be directed to a first adsorption vessel 106 or the second adsorption vessel 114 to remove impurities (e.g., siloxanes) by opening and closing a combination of valves 116*a-h* to select the desired adsorption vessel for removing the impurities. Similarly, a $CO_2$-rich gas stream may be directed a first adsorption vessel 106 or a second adsorption vessel 114, depending on which adsorption vessel is in need of regeneration, by opening and closing an appropriate combination of valves 116*a-h*.

For instance, in the configuration shown in FIG. 2A, where the first adsorption vessel 106 adsorbs impurities from a source gas stream 101 and the second adsorption vessel 114 is regenerated by a $CO_2$-rich gas stream 108, the valve configurations may be as follows: 116*a* open; 116*b* closed; 116*c* open; 116*d* closed; 116*e* closed; 116*f* open; 116*g* closed; 116*h* open. Alternatively, in the configuration shown in FIG. 2B, where the second adsorption vessel 114 adsorbs impurities from a source gas stream 101 and the first adsorption vessel 106 is regenerated by a $CO_2$-rich gas stream 108, the valve configurations may be as follows: 116*a* closed; 116*b* open; 116*c* closed; 116*d* open; 116*e* open; 116*f* closed; 116*g* open; 116*h* closed.

In some embodiments, the system is configured to switch between configurations to alternately regenerate the adsorption medium in the adsorption vessel or the adsorption medium in the regeneration vessel, by switching one or more valves between on and off states, e.g., as shown above. Thus, the first vessel may be an adsorption vessel or a regeneration vessel, depending on the system configuration. Likewise, the second vessel may be an adsorption vessel or a regeneration vessel, depending on the system configuration.

Hereinafter, because the first adsorption vessel and the second adsorption vessel may carry out different functions, depending the configuration, the first or second adsorption vessel used to adsorb impurities from the source gas stream may be referred to herein below as the "adsorption vessel," while the adsorption vessel being regenerated by a gas stream (e.g., a $CO_2$-rich gas stream) may be referred to herein below as the "regeneration vessel." For instance, in FIG. 2A the "first adsorption vessel" is the "adsorption vessel," while the "second adsorption vessel" is the "regeneration vessel." In FIG. 2B, the "second adsorption vessel" is the "adsorption vessel," while the "first adsorption vessel" is the "regeneration vessel."

In some embodiments, the source gas stream 101 originates from a digester, a landfill, or an exhaust stream (e.g., from an engine). The source gas stream 101 may comprise carbon dioxide and at least one hydrocarbon (e.g., methane) and may contain impurities (e.g., siloxanes, VOCs, sulfur-containing compounds, ammonia, chlorine, etc.). The source gas stream may also comprise sulfur, nitrogen, hydrogen, and oxygen, among other components.

In some embodiments, the carbon dioxide-rich gas stream containing desorbed impurities may be removed from the system 100 through the regeneration line 113*b* to gas outlet 122, which may be in fluid communication with a vent, a gas storage system (not shown), a flare to combust impurities, or directed through a secondary system (e.g., a chiller) to sequester either carbon dioxide, the desorbed impurities, or both.

The first and second adsorption vessels 106, 114 may remove impurities (e.g., siloxanes) from the source gas stream. The adsorption vessel may contain an adsorption medium comprising, for example, activated carbons (ACs), inorganics (e.g., silica gel, alumina, and/or zeolites) or polymeric resins.

Adsorption Process

The source gas stream, before being directed into the adsorption vessel, may comprise carbon dioxide and at least one hydrocarbon (e.g., methane) and may further comprise impurities (e.g., siloxanes and/or VOCs). In some embodiments, the source gas stream is directed into a first adsorption vessel, which contains an adsorption medium capable of adsorbing impurities from the gas stream. In some embodiments, the adsorbent medium comprises any suitable material for adsorbing impurities (e.g., siloxanes, organosulfur compounds, VOCs, hydrocarbons, etc.) from a gas stream. In some embodiments, the adsorption medium comprises activated carbon, alumina, silica gel, zeolites, polymer beads, or any combination thereof.

In some embodiments, the source gas stream, before being directed into the adsorption vessel may comprise siloxanes and/or VOCs at a concentration of about 0 mg/Nm$^3$ to about 5000 mg/Nm$^3$, about 0 mg/Nm$^3$ to about 4500 mg/Nm$^3$, about 0 mg/Nm$^3$ to about 4000 mg/Nm$^3$, about 0 mg/Nm$^3$ to about 3500 mg/Nm$^3$, about 0 mg/Nm$^3$ to about 3000 mg/Nm$^3$, about 0 mg/Nm$^3$ to about 2500 mg/Nm$^3$, about 0 mg/Nm$^3$ to about 2000 mg/Nm$^3$, about 0 mg/Nm$^3$ to about 1500 mg/Nm$^3$, about 0 mg/Nm$^3$ to about 1000 mg/Nm$^3$, about 0 mg/Nm$^3$ to about 500 mg/Nm$^3$, about 0 mg/Nm$^3$ to about 100 mg/Nm$^3$, or any range or value therein.

In some embodiments, the source gas stream, before being directed into the adsorption vessel, may comprise siloxanes and/or VOCs at a concentration of about 10 mg/Nm$^3$ to about 5000 mg/Nm$^3$, about 100 mg/Nm$^3$ to about 5000 mg/Nm$^3$, about 500 mg/Nm$^3$ to about 5000 mg/Nm$^3$, about 1000 mg/Nm$^3$ to about 5000 mg/Nm$^3$, about 1500 mg/Nm$^3$ to about 5000 mg/Nm$^3$, about 2000 mg/Nm$^3$ to about 5000 mg/Nm$^3$, about 2500 mg/Nm$^3$ to about 5000 mg/Nm$^3$, about 3000 mg/Nm$^3$ to about 5000 mg/Nm$^3$, about 3500 mg/Nm$^3$ to about 5000 mg/Nm$^3$, about 4000 mg/Nm$^3$ to about 5000 mg/Nm$^3$, about 4500 mg/Nm$^3$ to about 5000 mg/Nm$^3$, or any range or value therein.

In some embodiments, the source gas stream, before being directed into the adsorption vessel, may comprise siloxanes and/or VOCs at a concentration of about 0 mg/Nm$^3$ to about 5000 mg/Nm$^3$, such as about 0 mg/Nm$^3$, about 10 mg/Nm$^3$, about 20 mg/Nm$^3$, about 30 mg/Nm$^3$, about 40 mg/Nm$^3$, about 50 mg/Nm$^3$, about 60 mg/Nm$^3$, about 70 mg/Nm$^3$, about 80 mg/Nm$^3$, about 90 mg/Nm$^3$, about 100 mg/Nm$^3$, about 200 mg/Nm$^3$, about 300 mg/Nm$^3$, about 400 mg/Nm$^3$, about 500 mg/Nm$^3$, about 600 mg/Nm$^3$, about 700 mg/Nm$^3$, about 800 mg/Nm$^3$, about 900 mg/Nm$^3$, about 1000 mg/Nm$^3$, about 1500 mg/Nm$^3$, about 2000 mg/Nm$^3$, about 2500 mg/Nm$^3$, about 3000 mg/Nm$^3$, about 3500 mg/Nm$^3$, about 4000 mg/Nm$^3$, about 4500 mg/Nm$^3$, about 5000 mg/Nm$^3$, or any range or value therein.

The adsorption process for removing impurities from the source gas stream may take place at any suitable pressure for removing impurities from the source gas (e.g., adsorbing impurities onto an adsorption medium). For example, the pressure may be in a range of about 0 psig to about 150 psig, about 0 psig to about 140 psig, about 0 psig to about 130 psig, about 0 psig to about 120 psig, about 0 psig to about 110 psig, about 0 psig to about 100 psig, about 0 psig to about 90 psig, about 0 psig to about 80 psig, about 0 psig to about 70 psig, about 0 psig to about 60 psig, about 0 psig to about 50 psig, about 0 psig to about 45 psig, about 0 psig to about 40 psig, about 0 psig to about 35 psig, about 0 psig to about 30 psig, about 0 psig to about 25 psig, about 0 psig to about 20 psig, about 0 psig to about 15 psig, about 0 psig to about 10 psig, about 0 psig to about 9 psig, about 0 psig to about 8 psig, about 0 psig to about 7 psig, about 0 psig to about 6 psig, about 0 psig to about 5 psig, about 0 psig to about 4 psig, about 0 psig to about 3 psig, about 0 psig to about 2 psig, about 0 psig to about 1 psig, or any range or value therein.

In some embodiments, the pressure for removing impurities from the source gas may be in the range of about 0 psig to about 150 psig, about 1 psig to about 150 psig, about 2 psig to about 150 psig, about 3 psig to about 150 psig, about 4 psig to about 150 psig, about 5 psig to about 150 psig, about 6 psig to about 150 psig, about 7 psig to about 150 psig, about 8 psig to about 150 psig, about 9 psig to about 150 psig, about 10 psig to about 150 psig, about 15 psig to about 150 psig, about 20 psig to about 150 psig, about 25 psig to about 150 psig, about 30 psig to about 150 psig, about 35 psig to about 150 psig, about 40 psig to about 150 psig, about 45 psig to about 150 psig, about 50 psig to about 150 psig, about 60 psig to about 150 psig, about 70 psig to about 150 psig, about 80 psig to about 150 psig, about 90 psig to about 150 psig, about 100 psig to about 150 psig, about 110 psig to about 150 psig, about 120 psig to about 150 psig, about 130 psig to about 150 psig, about 140 psig to about 150 psig, or any range or value therein.

In some embodiments, the pressure for removing impurities from the source gas may be about 0 psig, about 1 psig, about 2 psig, about 3 psig, about 4 psig, about 5 psig, about 6 psig, about 7 psig, about 8 psig, about 9 psig, about 10 psig, about 15 psig, about 20 psig, about 25 psig, about 30 psig, about 35 psig, about 40 psig, about 45 psig, about 50 psig, about 60 psig, about 70 psig, about 80 psig, about 90 psig, about 100 psig, about 110 psig, about 120 psig, about 130 psig, about 140 psig, about 150 psig, or any range or value thereinbetween.

The adsorption process for removing impurities from the source gas stream may take place at any suitable temperature for removing impurities from the source gas. For example, the temperature may be in a range of about 0° C. to about 50° C., about 0° C. to about 45° C., about 0° C. to about 40° C., about 0° C. to about 35° C., about 0° C. to about 30° C., about 0° C. to about 25° C., about 0° C. to about 20° C., about 0° C. to about 15° C., about 0° C. to about 10° C., about 0° C. to about 9° C., about 0° C. to about 8° C., about 0° C. to about 7° C., about 0° C. to about 6° C., about 0° C. to about 5° C., about 0° C. to about 4° C., about 0° C. to about 3° C., about 0° C. to about 2° C., about 0° C. to about 1° C., or any range or value therein.

In some embodiments, the temperature for removing impurities from the source gas may be in a range of about 0° C. to about 50° C., about 1° C. to about 50° C., about 2° C. to about 50° C., about 3° C. to about 50° C., about 4° C. to about 50° C., about 5° C. to about 50° C., about 6° C. to about 50° C., about 7° C. to about 50° C., about 8° C. to about 50° C., about 9° C. to about 50° C., about 10° C. to about 50° C., about 15° C. to about 50° C., about 20° C. to about 50° C., about 25° C. to about 50° C., about 30° C. to about 50° C., about 35° C. to about 50° C., about 40° C. to about 50° C., about 45° C. to about 50° C., or any range or value therein.

In some embodiments, the temperature for removing impurities from the source gas may be about 0-50° C., such as about 0° C., about 1° C., about 2° C., about 3° C., about 4° C., about 5° C., about 6° C., about 7° C., about 8° C., about 9° C., about 10° C., about 15° C., about 20° C., about 25° C., about 30° C., about 35° C., about 40° C., about 45° C., about 50° C., or any range or value therein.

In some embodiments, the source gas stream, after exiting the adsorption vessel, may comprise siloxanes and/or VOCs at a concentration of about 0 mg/Nm$^3$ to about 500 mg/Nm$^3$, about 0 mg/Nm$^3$ to about 450 mg/Nm$^3$, about 0 mg/Nm$^3$ to about 400 mg/Nm$^3$, about 0 mg/Nm$^3$ to about 350 mg/Nm$^3$, about 0 mg/Nm$^3$ to about 300 mg/Nm$^3$, about 0 mg/Nm$^3$ to about 250 mg/Nm$^3$, about 0 mg/Nm$^3$ to about 200 mg/Nm$^3$, about 0 mg/Nm$^3$ to about 150 mg/Nm$^3$, about 0 mg/Nm$^3$ to about 100 mg/Nm$^3$, about 0 mg/Nm$^3$ to about 50 mg/Nm$^3$, about 0 mg/Nm$^3$ to about 40 mg/Nm$^3$, about 0 mg/Nm$^3$ to about 30 mg/Nm$^3$, about 0 mg/Nm$^3$ to about 20 mg/Nm$^3$, about 0 mg/Nm$^3$ to about 10 mg/Nm$^3$, or any range or value therein.

In some embodiments, the source gas stream, after exiting the adsorption vessel, may comprise siloxanes and/or VOCs at a concentration of about 10 mg/Nm$^3$ to about 500 mg/Nm$^3$, about 20 mg/Nm$^3$ to about 500 mg/Nm$^3$, about 30 mg/Nm$^3$ to about 500 mg/Nm$^3$, about 40 mg/Nm$^3$ to about 500 mg/Nm$^3$, about 50 mg/Nm$^3$ to about 500 mg/Nm$^3$, about 100 mg/Nm$^3$ to about 500 mg/Nm$^3$, about 150 mg/Nm$^3$ to about 500 mg/Nm$^3$, about 200 mg/Nm$^3$ to about 500 mg/Nm$^3$, about 250 mg/Nm$^3$ to about 500 mg/Nm$^3$, about 300 mg/Nm$^3$ to about 500 mg/Nm$^3$, about 350 mg/Nm$^3$ to about 500 mg/Nm$^3$, about 400 mg/Nm$^3$ to about 500 mg/Nm$^3$, about 450 mg/Nm$^3$ to about 500 mg/Nm$^3$, or any range or value therein.

In some embodiments, the source gas stream, after exiting the adsorption vessel, may comprise siloxanes and/or VOCs at a concentration of about 0 to 500 mg/Nm$^3$, such as about 0 mg/Nm$^3$, about 10 mg/Nm$^3$, about 20 mg/Nm$^3$, about 30 mg/Nm$^3$, about 40 mg/Nm$^3$, about 50 mg/Nm$^3$, about 60 mg/Nm$^3$, about 70 mg/Nm$^3$, about 80 mg/Nm$^3$, about 90 mg/Nm$^3$, about 100 mg/Nm$^3$, about 150 mg/Nm$^3$, about 200 mg/Nm$^3$, about 250 mg/Nm$^3$, about 300 mg/Nm$^3$, about 350 mg/Nm$^3$, about 400 mg/Nm$^3$, about 450 mg/Nm$^3$, about 500 mg/Nm$^3$, or any range or value therein.

Gas Separation

In some embodiments, the source gas stream can be separated into a carbon dioxide-rich gas stream and a substantially $CO_2$-free gas stream using a separator (e.g., a membrane, pressure swing adsorption system, temperature swing adsorption system, vacuum swing adsorption system, distillation system, or any other suitable gas separation process (or separator)). In some embodiments, the separator (e.g., membrane) may selectively separate a $CO_2$-rich gas stream as the permeate and retain a substantially $CO_2$-free gas stream (e.g., a methane-rich gas stream) as the retentate. In some embodiments, the separator (e.g., membrane) may comprise a polymer membrane (e.g., cellulose acetate, polyimide, or combinations thereof). In some embodiments, the separator (e.g., membrane) may comprise an inorganic membrane (e.g., silica, zeolites, carbon molecular sieves, etc.). In some embodiments, the separator (e.g., membrane) may comprise a mixed matrix membrane (e.g., a polymeric membrane comprising a dispersed inorganic filler).

The source gas stream, before being directed into the separator (e.g., membrane), may comprise carbon dioxide and at least one hydrocarbon (e.g., methane). In some embodiments, the source gas stream before being directed into the separator (e.g., membrane), may have a $CO_2$ concentration of about 20 vol. % to about 60 vol. %, about 25 vol. % to about 60 vol. %, about 30 vol. % to about 60 vol. %, about 35 vol. % to about 60 vol. %, about 40 vol. % to about 60 vol. %, about 45 vol. % to about 60 vol. %, about 50 vol. % to about 60 vol. %, or any range or value therein. In some embodiments, the source gas stream, before being directed into the separator (e.g., membrane), may have a $CO_2$ concentration of about 20 vol. % to about 60 vol. %, about 20 vol. % to about 55 vol. %, about 20 vol. % to about 50 vol. %, about 20 vol. % to about 45 vol. %, about 20 vol. % to about 40 vol. %, about 20 vol. % to about 35 vol. %, about 20 vol. % to about 30 vol. %, or any range or value therein. In some embodiments, the source gas stream, before being directed into the separator (e.g., membrane), may have a $CO_2$ concentration of about 20-60 vol. %, such as about 20 vol. %, about 25 vol. %, about 30 vol. %, about 35 vol. %, about 40 vol. %, about 45 vol. %, about 50 vol. %, about 55 vol. %, about 60 vol. %, or any range or value thereinbetween.

The $CO_2$-rich gas stream, upon exiting the separator (e.g., membrane), may comprise carbon dioxide at a concentration of at least about 85 vol. %, at least about 86 vol. %, at least about 87 vol. %, at least about 88 vol. %, at least about 89 vol. %, at least about 90 vol. %, at least about 91 vol. %, at least about 92 vol. %, at least about 93 vol. %, at least about 94 vol. %, at least about 95 vol. %, at least about 96%, at least about 97 vol. %, at least about 98 vol. %, at least about 99 vol. %, at least about 99.5 vol. %, at least about 99.6 vol. %, at least about 99.7 vol. %, at least about 99.8 vol. %, or at least about 99.9 vol. %, or any range or value therein.

In some embodiments, the first ($CO_2$-rich) gas stream, upon exiting the separator (e.g., membrane), may comprise carbon dioxide at a concentration of about 85-100 vol. %, such as about 85 vol. %, about 86 vol. %, about 87 vol. %, about 88 vol. %, about 89 vol. %, about 90 vol. %, about 91 vol. %, about 92 vol. %, about 93 vol. %, about 94 vol. %, about 95 vol. %, about 96 vol. %, about 97 vol. %, about 98 vol. %, about 99 vol. %, about 99.5 vol. %, about 99.6 vol. %, about 99.7 vol. %, about 99.8 vol. %, about 99.9 vol. %, or any range or value thereinbetween.

The $CO_2$-rich gas stream, upon exiting the separator (e.g., membrane), may comprise at least one hydrocarbon (e.g., methane) at a concentration of no greater than about 10 vol. %, no greater than about 5 vol. %, no greater than about 4 vol. %, no greater than about 3 vol. %, no greater than about 2 vol. %, no greater than 1 vol. %, no greater than about 0.5 vol. %, no greater than about 0.4 vol. %, no greater than about 0.3 vol. %, no greater than about 0.2 vol. %, or no greater than about 0.1 vol. %.

In some embodiments, the $CO_2$-rich gas stream, upon exiting the separator (e.g., membrane), may comprise at least one hydrocarbon (e.g., methane) at a concentration of about 0-15 vol. %, such as about 0 vol. %, about 0.1 vol. %, about 0.2 vol. %, about 0.3 vol. %, about 0.4 vol. %, about 0.5 vol. %, about 0.6 vol. %, about 0.7 vol. %, about 0.8 vol. %, about 0.9 vol. %, about 1 vol. %, about 2 vol. %, about 3 vol. %, about 4 vol. %, about 5 vol. %, about 6 vol. %, about 7 vol. %, about 8 vol. %, about 9 vol. %, about 10 vol. %, about 11 vol. %, about 12 vol. %, about 13 vol. %, about 14 vol. %, about 15 vol. %, or any range or value thereinbetween.

In some embodiments, a substantially $CO_2$-free gas stream (or retentate) exits the separator (e.g., membrane). In some embodiments, the substantially $CO_2$-free gas stream comprises a hydrocarbon. In some embodiments, the substantially $CO_2$-free gas stream comprises methane. In some embodiments, the substantially $CO_2$-free gas stream comprises methane at a concentration of at least about 70 vol. %, at least about 75 vol. %, at least about 80 vol. %, at least about 85 vol. %, at least about 90 vol. %, at least about 91 vol. %, at least about 92 vol. %, at least about 93 vol. %, at least about 94 vol. %, at least about 95 vol. %, at least about 96 vol. %, at least about 97 vol. %, at least about 98 vol. %, at least about 99 vol. %, at least about 99.5 vol. %, or any range or value therein.

In some embodiments, the substantially $CO_2$-free gas stream comprises methane at a concentration of about 70-100 vol. %, such as about 70 vol. %, about 75 vol. %, about 80 vol. %, about 85 vol. %, about 90 vol. %, about 91 vol. %, about 92 vol. %, about 93 vol. %, about 94 vol. %, about 95 vol. %, about 96 vol. %, about 97 vol. %, about 98 vol. %, about vol. %, about 99.5 vol. %, or any range or value therein.

In some embodiments, the substantially $CO_2$-free gas stream comprises additional components, including, for example, 1-10 vol. % $CO_2$, 0-20 vol. % $N_2$, $O_2$, or any combination thereof. In some embodiments, the substantially $CO_2$-free gas stream comprises trace amounts (e.g., 1 vol. % or less) of contaminants (e.g., siloxanes, sulfur-containing gases, VOCs, ammonia, etc.).

In some embodiments, the substantially $CO_2$-free gas stream comprises $CO_2$ at a concentration of less than or equal to 10 vol. %, less than or equal to about 5 vol. %, less than or equal to about 4 vol. %, less than or equal to about 3 vol. %, less than or equal to about 2 vol. %, less than or equal to about 1.5 vol. %, less than or equal to about 1.0 vol. %, less than or equal to about 0.9 vol. %, less than or equal to about 0.8 vol. %, less than or equal to about 0.7 vol. %, less than or equal to about 0.6 vol. %, less than or equal to about 0.5 vol. %, less than or equal to about 0.4 vol. %, less than or equal to about 0.3 vol. %, less than or equal to about 0.2 vol. %, less than or equal to about 0.1 vol. %, less than or equal to about 0.09 vol. %, less than or equal to about 0.08 vol. %, less than or equal to about 0.07 vol. %, less than or equal to about 0.06 vol. %, less than or equal to about 0.05 vol. %, less than or equal to about 0.04 vol. %, less than or equal to about 0.03 vol. %, less than or equal to about 0.02 vol. %, less than or equal to about 0.01 vol. %, or any range or value therein.

Regeneration Process

The $CO_2$-rich gas stream, before being directed into the regeneration vessel, may comprise carbon dioxide and at least one hydrocarbon (e.g., methane), may further comprise other gases (e.g., 0-10% oxygen and/or nitrogen), and may comprise trace amounts of contaminants. In some embodiments, the $CO_2$-rich gas stream is directed into a regeneration vessel (e.g., the second adsorption vessel) which contains an adsorption medium comprising impurities adsorbed from a source gas stream. In some embodiments, the adsorption medium comprises any suitable material for adsorbing impurities (e.g., siloxanes, VOCs, hydrocarbons, etc.) from a gas stream. In some embodiments, the adsorption medium comprises activated carbon, alumina, silica gel, zeolites, polymer beads, or any combination thereof.

The regeneration process for desorbing adsorbed impurities from the adsorption medium in the regeneration vessel may take place at any suitable pressure for desorbing impurities from the adsorption medium. For example, the pressure may be in a range of about 0 psig to about 25 psig, about 0 psig to about 20 psig, about 0 psig to about 15 psig, about 0 psig to about 10 psig, about 0 psig to about 9 psig, about 0 psig to about 8 psig, about 0 psig to about 7 psig, about 0 psig to about 6 psig, about 0 psig to about 5 psig, about 0 psig to about 4 psig, about 0 psig to about 3 psig, about 0 psig to about 2 psig, about 0 psig to about 1 psig, or any range or value therein.

In some embodiments, the pressure for desorbing adsorbed impurities from the adsorption medium in the regeneration vessel may be in the range of about 0 psig to about 25 psig, about 1 psig to about 25 psig, about 2 psig to about 25 psig, about 3 psig to about 25 psig, about 4 psig to about 25 psig, about 5 psig to about 25 psig, about 6 psig to about 25 psig, about 7 psig to about 25 psig, about 8 psig to about 25 psig, about 9 psig to about 25 psig, about 10 psig to about 25 psig, about 15 psig to about 25 psig, about 20 psig to about 25 psig, or any range or value therein.

In some embodiments, the pressure for desorbing adsorbed impurities from the adsorption medium in the regeneration vessel may be about 0 psig, about 1 psig, about 2 psig, about 3 psig, about 4 psig, about 5 psig, about 6 psig, about 7 psig, about 8 psig, about 9 psig, about 10 psig, about 15 psig, about 20 psig, about 25 psig, or any range or value thereinbetween.

In some embodiments, the $CO_2$-rich gas stream exiting the separator (e.g., membrane) may be heated before being directed into a regeneration vessel to desorb adsorbed impurities from the adsorption medium in the regeneration vessel. In some embodiments, the heater may be an electric heater or heat exchanger (e.g., if heat is available from the process carried out on site, such as from engine exhaust, recovery from a regeneration gas, etc.).

The regeneration process for desorbing adsorbed impurities from the adsorption medium in the regeneration vessel may take place at any suitable temperature for desorbing adsorbed impurities from the adsorption medium. For example, the temperature may be in a range of about 50° C. to about 400° C., about 60° C. to about 400° C., about 70° C. to about 400° C., about 80° C. to about 400° C., about 90° C. to about 400° C., about 100° C. to about 400° C., about 110° C. to about 400° C., about 120° C. to about 400° C., about 130° C. to about 400° C., about 140° C. to about 400° C., about 150° C. to about 400° C., about 160° C. to about 400° C., about 170° C. to about 400° C., about 180° C. to about 400° C., about 190° C. to about 400° C., about 200° C. to about 400° C., about 210° C. to about 400° C., about 220° C. to about 400° C., about 230° C. to about 400° C., about 240° C. to about 400° C., about 250° C. to about 400° C., about 260° C. to about 400° C., about 270° C. to about 400° C., about 280° C. to about 400° C., about 290° C. to about 400° C., about 300° C. to about 400° C., about 310° C. to about 400° C., about 320° C. to about 400° C., about 330° C. to about 400° C., about 340° C. to about 400° C., about 350° C. to about 400° C., or any range or value therein.

In some embodiments, the temperature for desorbing adsorbed impurities from the adsorption medium in the regeneration vessel may be in a range of about 50° C. to about 400° C., about 50° C. to about 390° C., about 50° C. to about 380° C., about 50° C. to about 370° C., about 50° C. to about 360° C., about 50° C. to about 350° C., about 50° C. to about 340° C., about 50° C. to about 330° C., about 50° C. to about 320° C., about 50° C. to about 310° C., about 50° C. to about 300° C., about 50° C. to about 290° C., about 50° C. to about 280° C., about 50° C. to about 270° C., about 50° C. to about 260° C., about 50° C. to about 250° C., about 50° C. to about 240° C., about 50° C. to about 230° C., about 50° C. to about 220° C., about 50° C. to about 210° C., about 50° C. to about 200° C., about 50° C. to about 190° C., about 50° C. to about 180° C., about 50° C. to about 170° C., about 50° C. to about 160° C., about 50° C. to about 150° C., about 50° C. to about 140° C., about 50° C. to about 130° C., about 50° C. to about 120° C., about 50° C. to about 110° C., about 50° C. to about 100° C., or any range or value therein.

In some embodiments, the temperature for desorbing adsorbed impurities from the adsorption medium in the regeneration vessel may be about 50-100° C., such as about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., or any range or value thereinbetween.

The present disclosure is not to be limited in terms of the particular embodiments described in this application, which are intended as single illustrations of individual aspects of the disclosure. All the various embodiments of the present disclosure will not be described herein. Many modifications and variations of the disclosure can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

It is to be understood that the present disclosure is not limited to particular uses, methods, reagents, compounds, compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

What is claimed is:

1. A method for regenerating an adsorption medium, comprising:

receiving a source gas stream comprising at least one hydrocarbon and carbon dioxide;

separating the source gas stream into a carbon dioxide-rich gas stream and a substantially carbon dioxide-free gas stream;

directing the carbon dioxide-rich gas stream into a regeneration vessel containing an adsorption medium having one or more adsorbed impurities on the adsorption medium;

desorbing impurities from the adsorption medium by contacting the adsorption medium with the carbon dioxide-rich gas stream to generate a carbon dioxide-rich gas containing desorbed impurities and a regenerated adsorption medium;

directing the carbon dioxide-rich gas containing desorbed impurities out of the regeneration vessel; and after the separating and before the desorbing, heating the carbon dioxide-rich gas stream to a temperature of from 50° C. to 400° C.

2. The method of claim 1, wherein the at least one hydrocarbon comprises methane.

3. The method of claim 1, wherein the adsorbed impurities comprise siloxanes.

4. The method of claim 1, wherein the separating is performed using a membrane, pressure swing adsorption device, or any other gas separation process.

5. The method of claim 4, wherein the separating is performed using a mixed matrix membrane.

6. The method of claim 1, wherein the heating comprises raising the temperature of the carbon dioxide-rich gas stream to a temperature of from 50° C. to 150° C.

7. The method of claim 1, wherein the carbon dioxide-rich gas stream comprises at least 90 vol. % carbon dioxide.

8. The method of claim 1, wherein the adsorption medium in the regeneration vessel comprises polymer beads, alumina, silica gel, activated carbon, a zeolite, or a combination thereof.

9. The method of claim 1, wherein the source gas stream is received from a digester or landfill.

10. The method of claim 1, further comprising:

after receiving the source gas stream comprising at least one hydrocarbon and carbon dioxide, and before separating the source gas stream into the carbon dioxide-rich gas stream and the substantially carbon dioxide-free gas stream:

directing the source gas stream into an adsorption vessel containing an adsorption medium in the adsorption vessel;

contacting the source gas stream with the adsorption medium in the adsorption vessel and adsorbing impurities from the source gas stream onto the adsorption medium in the adsorption vessel to generate an adsorption medium in the adsorption vessel containing one or more adsorbed impurities on the adsorption medium in the adsorption vessel.

11. The method of claim 10, wherein the adsorption medium in the adsorption vessel comprises polymer beads, alumina, silica gel, activated carbon, a zeolite, or a combination thereof.

12. A system for regenerating an adsorption medium, comprising:

a gas inlet coupled to an gas inlet line and in fluid communication with a source gas stream;

a membrane coupled to the gas inlet line, wherein the membrane is downstream from the gas inlet, and wherein the membrane is configured to separate the source gas stream into a carbon dioxide-rich gas stream and a substantially carbon dioxide-free gas stream;

an adsorption vessel coupled to the gas inlet line between the gas inlet and the membrane, and wherein the adsorption vessel contains an adsorption medium that adsorbs impurities from the source gas stream;

a regeneration line between the membrane and a regeneration vessel downstream from the membrane, wherein the regeneration line is configured to direct the carbon dioxide-rich gas stream into the regeneration vessel, and wherein the regeneration vessel comprises an adsorption medium comprising adsorbed impurities;

a heater coupled to the regeneration line between the membrane and the regeneration vessel, wherein the heater is configured to heat the carbon dioxide-rich gas stream to a temperature of from 50° C. to 400° C. before it enters the regeneration vessel; and a gas outlet coupled to the regeneration line, wherein the gas outlet is downstream from the regeneration vessel.

13. The system of claim 12, wherein the membrane is a mixed matrix membrane.

14. The system of claim 12, wherein the gas outlet is in fluid communication with a vent, gas storage system, or a flare.

15. The system of claim 12, wherein the gas outlet is in fluid communication with a system for sequestering $CO_2$ or desorbed impurities.

16. The system of claim 12, wherein the adsorption medium in the adsorption vessel comprises activated carbons, silica gel, alumina, zeolites, polymeric resins, or combinations thereof.

17. The system of claim 12, wherein the adsorption medium in the regeneration vessel comprises activated carbons, silica gel, alumina, zeolites, polymeric resins, or combinations thereof.

18. The system of claim 12, wherein the system is configured to switch between configurations to alternately regenerate the adsorption medium in the adsorption vessel or the adsorption medium in the regeneration vessel.

* * * * *